US010219021B2

United States Patent
Dimitriadis et al.

(10) Patent No.: US 10,219,021 B2
(45) Date of Patent: *Feb. 26, 2019

(54) METHOD AND APPARATUS FOR PROCESSING COMMANDS DIRECTED TO A MEDIA CENTER

(71) Applicant: AT&T INTELLECTUAL PROPERTY I, L.P., Atlanta, GA (US)

(72) Inventors: Dimitrios Dimitriadis, Rutherford, NJ (US); Horst Juergen Schroeter, Vero Beach, FL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,013

(22) Filed: May 8, 2017

(65) Prior Publication Data
US 2017/0244997 A1    Aug. 24, 2017

Related U.S. Application Data

(63) Continuation of application No. 13/647,967, filed on Oct. 9, 2012, now Pat. No. 9,678,713.

(51) Int. Cl.
*H04N 21/4223* (2011.01)
*H04N 5/44* (2011.01)
(Continued)

(52) U.S. Cl.
CPC ......... *H04N 21/4223* (2013.01); *G06F 3/011* (2013.01); *G06F 3/017* (2013.01); *G06F 3/0304* (2013.01); *G06F 3/038* (2013.01); *G06F 3/167* (2013.01); *H04N 5/4403* (2013.01); *H04N 21/42203* (2013.01); *H04N 21/4394* (2013.01); *H04N 21/44008* (2013.01); *H04N 21/4415* (2013.01); *H04N 21/44218* (2013.01); *H04N 21/440236* (2013.01); *H04N 21/4532* (2013.01); *H04N 21/47* (2013.01); *G06F 2203/0381* (2013.01); *H04N 2005/4428* (2013.01);
(Continued)

(58) Field of Classification Search
CPC ......... H04N 21/42203; H04N 21/4394; H04N 21/440236; H04N 21/47; G06F 3/011; G06F 3/038; G06F 2203/0381
USPC .............................. 348/169, 211.4, E05.042
See application file for complete search history.

(56) References Cited

U.S. PATENT DOCUMENTS

| | | |
|---|---|---|
| 5,940,118 A | 8/1999 | Van Schyndel |
| 6,937,718 B2 | 8/2005 | Scholte |

(Continued)

*Primary Examiner* — Zaihan Jiang
(74) *Attorney, Agent, or Firm* — Guntin & Gust, PLC; Ralph Trementozzi (57) ABSTRACT

A system that incorporates teachings of the subject disclosure may include, for example, a method for controlling a steering of a plurality of cameras to identify a plurality of potential sources, identifying the plurality of potential sources according to image data provided by the plurality of cameras, assigning a beam of a plurality of beams of a plurality of microphones to each of the plurality of potential sources, detecting a first command comprising one of a first audible cue based on signals from a portion of the plurality of microphones, a first visual cue based on image data from one of the plurality of cameras, or both for controlling a media center, and configuring the media center according to the first command. Other embodiments are disclosed.

20 Claims, 7 Drawing Sheets

(51) Int. Cl.
   *H04N 21/45*     (2011.01)
   *H04N 21/422*    (2011.01)
   *H04N 21/439*    (2011.01)
   *H04N 21/44*     (2011.01)
   *H04N 21/4402*   (2011.01)
   *H04N 21/4415*   (2011.01)
   *H04N 21/47*     (2011.01)
   *G06F 3/01*      (2006.01)
   *G06F 3/03*      (2006.01)
   *G06F 3/038*     (2013.01)
   *G06F 3/16*      (2006.01)
   *H04N 21/442*    (2011.01)

(52) U.S. Cl.
   CPC ............... *H04N 2005/4432* (2013.01); *H04N 2005/4442* (2013.01)

(56) References Cited

U.S. PATENT DOCUMENTS

| | | | |
|---|---|---|---|
| 7,245,734 | B2 | 7/2007 | Niederdraenk |
| 7,369,100 | B2 | 5/2008 | Zacks |
| 7,817,798 | B2 | 10/2010 | Downing |
| 7,995,771 | B1 | 8/2011 | Faltys |
| 8,098,842 | B2 | 1/2012 | Florencio |
| 8,116,534 | B2 | 2/2012 | Nishiyama |
| 8,208,970 | B2 | 6/2012 | Cheung |
| 8,230,367 | B2 | 7/2012 | Bell |
| 9,678,713 | B2 * | 6/2017 | Dimitriadis ...... H04N 21/42203 |
| 2004/0113939 | A1 | 6/2004 | Zacks |
| 2004/0148197 | A1 | 7/2004 | Kerr |
| 2004/0208324 | A1 | 10/2004 | Cheung |
| 2005/0036036 | A1 | 2/2005 | Stevenson et al. |
| 2005/0057491 | A1 | 3/2005 | Zacks |
| 2005/0141731 | A1 | 6/2005 | Hamalainen |
| 2005/0272416 | A1 | 12/2005 | Ooi |
| 2006/0184501 | A1 | 8/2006 | Yoshida et al. |
| 2007/0033012 | A1 | 2/2007 | Rosenberg et al. |
| 2007/0165866 | A1 | 7/2007 | Super |
| 2007/0192910 | A1 * | 8/2007 | Vu ............... B25J 5/007 700/245 |
| 2008/0252596 | A1 | 10/2008 | Bell |
| 2009/0118002 | A1 * | 5/2009 | Lyons ............ G06Q 30/02 463/29 |
| 2010/0302401 | A1 | 12/2010 | Oku |
| 2011/0026765 | A1 * | 2/2011 | Ivanich ........... H04N 5/4403 382/103 |
| 2011/0248935 | A1 | 10/2011 | Mellow |
| 2011/0316996 | A1 | 12/2011 | Abe |
| 2012/0075463 | A1 * | 3/2012 | Chen .............. G01S 11/12 348/135 |
| 2012/0124603 | A1 | 5/2012 | Amada |
| 2012/0134507 | A1 | 5/2012 | Dimitriadis |
| 2012/0163625 | A1 | 6/2012 | Siotis |
| 2012/0226981 | A1 * | 9/2012 | Clavin ............ G06F 3/005 715/719 |
| 2012/0259638 | A1 * | 10/2012 | Kalinli ........... G10L 15/25 704/270 |
| 2012/0327177 | A1 * | 12/2012 | Kee ............... H04N 7/15 348/14.08 |
| 2013/0107028 | A1 * | 5/2013 | Gleiner .......... H04R 3/00 348/77 |
| 2013/0127980 | A1 | 5/2013 | Haddick et al. |
| 2013/0159939 | A1 * | 6/2013 | Krishnamurthi ........ G06F 3/011 715/863 |
| 2013/0307771 | A1 * | 11/2013 | Parker ............ G06F 3/013 345/158 |
| 2014/0098233 | A1 * | 4/2014 | Martin ........... H04M 1/19 348/152 |

* cited by examiner

METHOD AND APPARATUS FOR PROCESSING COMMANDS DIRECTED TO A MEDIA CENTER

CROSS-REFERENCE TO RELATED APPLICATIONS

This application is a Continuation of and claims priority to U.S. patent application Ser. No. 13/647,967, filed Oct. 9, 2012, now U.S. Patent Pub. No. 2014/0098240. All sections of the aforementioned application are incorporated herein by reference in its entirety.

FIELD OF THE DISCLOSURE

The subject disclosure relates to a method and apparatus for processing commands directed to a media center.

BACKGROUND

Media consumption has increased substantially over the past decade. Consumers today download more media content than ever before. High definition video and audio content is now commonly experienced with high definition displays and sophisticated audio processing systems such as surround-sound systems. Accessibility to content has also become ubiquitous thanks to high bandwidth wireless communications. Management of media content, however, has not evolved as quickly as the distribution of content. Typically, users rely on traditional user input devices such as remote controllers, keyboards, touch screen displays, and other accessories to control and manage content.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of a system for monitoring users, detecting audible cues, visual cues, or a combination thereof for controlling operations of or interacting with a media center. Other embodiments are included in the subject disclosure.

One embodiment of the subject disclosure includes a method for detecting, by a system comprising a processor, with a plurality image sensors a plurality of potential sources, steering, by the system, the plurality of image sensors to identify the plurality of potential sources, and identifying, by the system, the plurality of potential sources according to image data provided by the plurality of image sensors. The method can further comprise steering, by the system, a microphone array according to the image data to detect speech signals generated by the plurality of potential sources, detecting, by the system, a first command comprising one of a first audible cue provided by the microphone array, a first visual cue provided by the plurality of image sensors, or both for controlling a media center, and processing, by the system, the first command to control the media center.

One embodiment of the subject disclosure includes a computer-readable storage medium, comprising computer instructions which, responsive to being executed by a processor, cause the processor to perform operations comprising causing a steering of a plurality of cameras to identify a plurality of potential sources, identifying the plurality of potential sources according to image data provided by the plurality of cameras, assigning a beam of a plurality of beams of a plurality of microphones to each of the plurality of potential sources, detecting a first command comprising one of a first audible cue provided by a portion of the plurality of microphones, a first visual cue provided by one of the plurality of cameras, or both for controlling a media center, and configuring the media center according to the first command.

One embodiment of the subject disclosure includes a system, comprising a memory to store instructions, and a processor coupled to the memory. Responsive to executing the instructions, the processor can perform operations comprising causing a plurality of microphones to steer a plurality of beams of the plurality of microphones to assign a beam to each of a plurality of potential sources for controlling a media center, detecting a command comprising one of an audible cue provided by a portion of the plurality of microphones, a visual cue provided by one of the plurality of image sensors, or both for controlling the media center, and causing the media center to execute the command.

Figure 1:
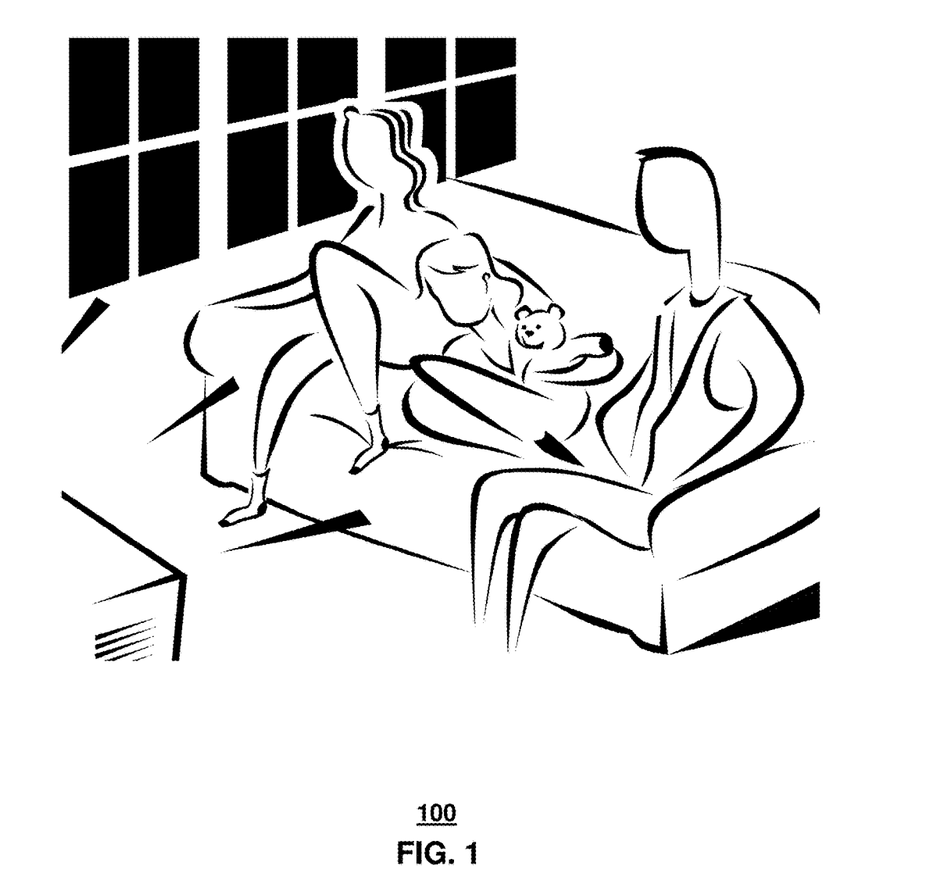
FIG. 1 depicts an illustrative embodiment of an entertainment setting.
Figure 2:
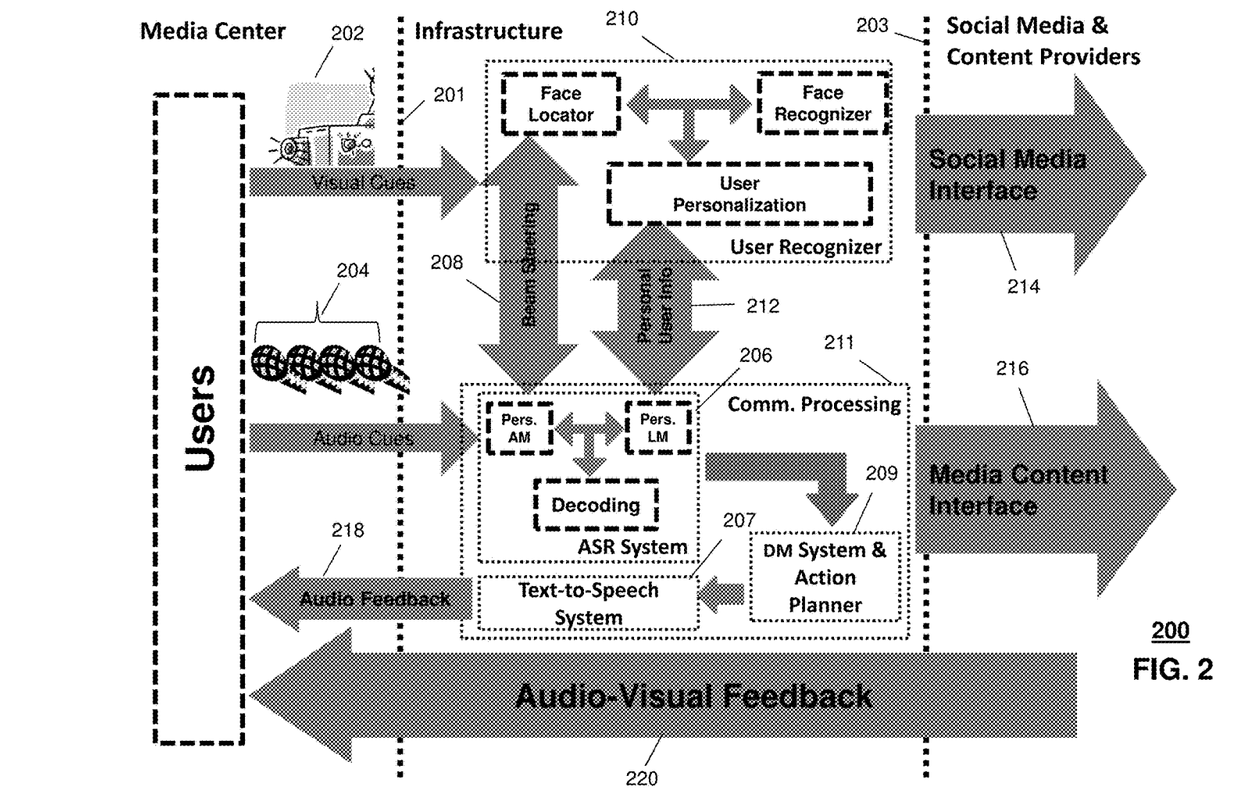
FIG. 2 depicts an illustrative embodiment of a system that can be utilized in the entertainment setting of FIG. 1.

FIG. 1 depicts an illustrative embodiment of an entertainment setting 100. In the illustration of FIG. 1, a family is viewing a television program, movie, video game or some other form of visual and audible entertainment. Although not shown, family members can be conversing with each other such as by sharing their views on a program or video game they are experiencing. Conversations are typical in sporting events, video games, and television shows where, for example, guests are being voted on for their musical talent, game shows where contestants are competing with each other for prizes, and so on. FIG. 2 depicts an illustrative embodiment of a system 200 that can be utilized in the entertainment setting 100 of FIG. 1.

System 200 can comprise user equipment such as a plurality of image sensors 202 such as cameras, and a microphone array 204. It would be appreciated that alternatively the microphone array 204 can be replaced or combined with a plurality of microphones interspersed in an area where the user equipment is located. Other arrangements of microphones can be used. For illustration purposes only, the microphone array 204 will be referred to below. The user equipment can be located in the premises of the users to visually and audibly monitor the users with the cameras 202 and microphone array 204. The user equipment can be coupled to a computing device or can be an integral part of the computing device. The computing device can be a set-top box, a computer system, or any other suitable device that has computing and communication resources which can be accessed by remote infrastructure such as servers, routers, and other forms of communication equipment. Assuming for illustration purposes only that the computing device is a set-top box, the set-top box can be coupled to the cameras 202 and microphone array 204 and can be configured to provide visual cues and audio cues supplied by the cameras 202, and the microphone array 204 to infrastructure equipment 201 remote from the set-top box.

The infrastructure equipment 201 can comprise a user recognizer module 210 that utilizes image processing technology to locate a user's face, recognize the user, and retrieve personalization information such as a user profile associated with the user. The user recognizer module 210 can be a network server having hardware and software resources that perform image processing techniques on the visual cues to identify users, and to retrieve personalization data of recognized users.

The infrastructure equipment 201 can further comprise a communication processing module 211 for processing audio cues detected by the microphone array 204, and to provide audio feedback 218 or audio-visual feedback 220 to the set-top box which in turn can present visual feedback by way of a display coupled to the set-top box, and audio feedback by way of a speaker system coupled the set-top box. The communication processing module 211 can be another network server (or the same network server used by the recognizer module 210) having hardware and software resources for performing speech recognition, text to speech synthesis, as well as other functions.

The user recognizer module 210 can be configured to remotely steer the cameras 202 by way of directives provided to the set-top box. The user recognizer module 210 can also share information such as user profiles with the communication processing module 211. The user recognizer module 210 can also direct the microphone array 204 by way of the communication processing module 211 to remotely steer the microphone array 204 electro-mechanically or using beamforming techniques. Based on facial recognition of one or more users, the user recognizer module 210 can, for example, cause the microphone array 204 to assign a beam to each detected user in a direction determined from image data provided by one or more of the cameras 202.

The user recognizer module 210 can also be configured to facilitate communications between the set-top box and social networks by way of a social media interface 214. The communication processing module 211 can further be configured to provide media content to the set-top box by facilitating access to content sources such as media on-demand databases, or to scheduled broadcast sources by way of a media content interface 216.

Figure 3:
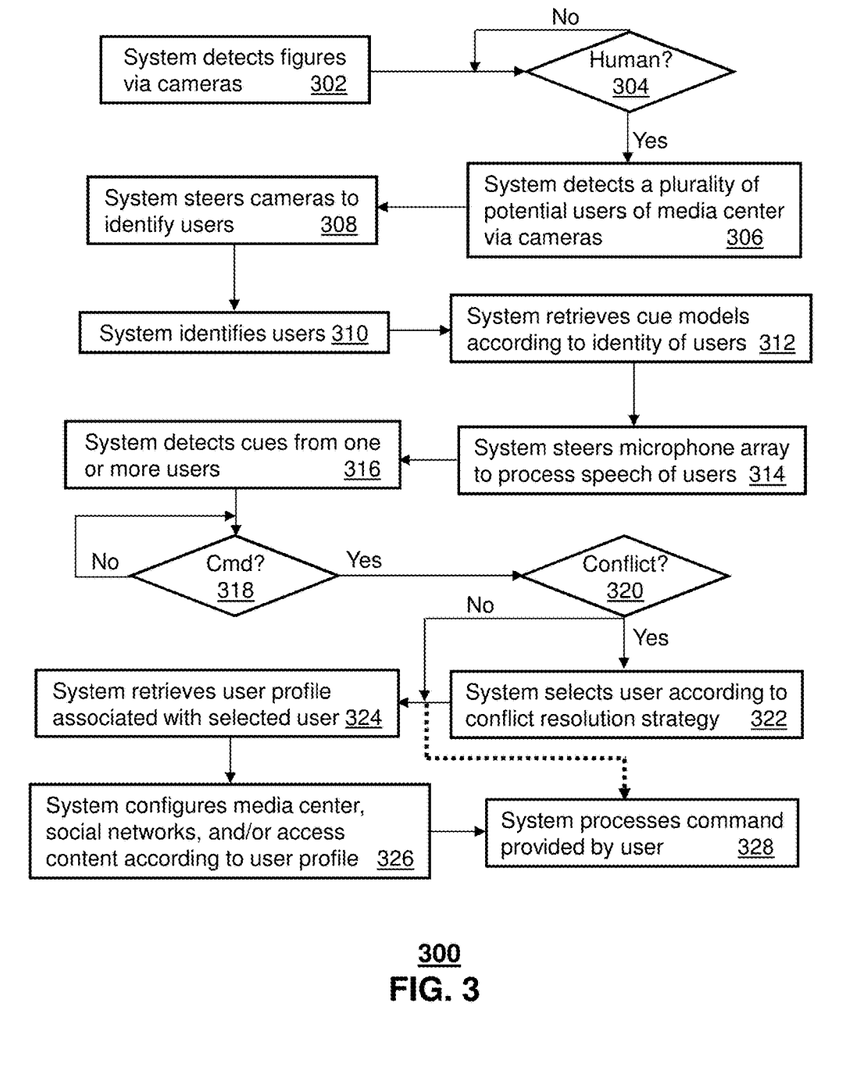
FIG. 3 depicts an illustrative embodiment of a method utilized in portions of the system of FIG. 2.

FIG. 3 depicts an illustrative embodiment of a method 300 utilized in portions of the system 200. Method 300 can begin with step 302 in which the system 200 detects objects or figures via the cameras 202. In step 304, the system 200 can determine if the objects or figures detected are human or non-human (e.g., pets). Non-human objects such as a pet can be determined by, for example, detecting in the images provided by the cameras that the object has four legs, and/or by the shape of the figure. Similar assessments can be made for humans. If the figures are human, the system 200 can proceed to step 306. In this step, system 200 can determine that the human figures detected in step 304 are potential users of the media center, which in the present illustration may be a set-top box. To determine who the users may be, the system 200 can cause at step 308 the cameras 202 to be steered towards each user for identification processing. The cameras 202 can be steered, for example, so that the system 200 can perform facial recognition processing by comparing image data received from the cameras 202 with entries in a biometric database. Alternatively, or in combination, the system 200 can direct the cameras 202 to also capture image data relating to body contours, body color, body surfaces, or combinations thereof to enhance the accuracy of identifying each user at step 310.

Once each user has been identified, system 200 can cause the communication processing module 211 to retrieve cue models associated with each identified user. Each cue model can be tailored to a particular user so that speech and visual processing can be further enhanced for the user. For example, a cue model can be tailored for a teenager who has provided speech samples and visual cues unique to the teenager. Another cue model can be trained and tailored for a sibling. Each parent can also be associated with tailored cue models. Any number of cue models can be used and tailored for any number of users of the media center. Additionally, each cue model can be trained according to speech and visual cues provided by each user.

Once a cue model has been selected for each user identified in step 310, the system proceeds to step 314 where it causes the microphone array 204 to be steered in the direction of each corresponding user. In one embodiment, steering can be performed according to a beamforming process. For instance, the microphone array 204 can be directed to assign an independent beam of the microphone array 204 to each user. In this manner, audio cues generated by a user to which the beam is focused can be readily detected and processed as a possible media center command. For microphone arrays with less sophistication, the microphone array 204 can be steered electromechanically to perform a similar function.

Once the cameras 202 and microphone array 204 have been properly steered towards each individual, in step 316, the system 200 can cause the communication processing module 211 to detect audio and/or visual cues from each user. The audio cues can be detected from audio feedback provided by the microphone array 204, and visual cues provided by the cameras 202. An audio cue can represent a speech command generated by a particular user. The cue model of a user can be configured to match the speech patterns of the user and the known visual cues of the user. With the use of tailored cue models, the system 200 can distinguish the audio and visual cues of one user over the audio and visual cues of other users.

Such a distinction enables each user to control the media center. During the customization process of a cue model, the communication processing module 211 can associate well known media commands with audio or visual cues. For example, if the user wishes to lower audio volume of a media center, a hand gesture (visual cue) uniquely created by the user may indicate a lower volume command. The gesture, speed of gesture, and duration of gesture can also be an indicator of how much and how quickly the user wants the volume to be lowered. Other customized visual cues can be created by users for controlling other media functions such as raising volume, muting, navigating between channels, presenting on-demand options, presenting DVR options, and so forth.

Audio cues can also be customized for controlling media center functions. For example, a user can initiate an audio cue that indicates volume is to be raised or lowered by a percentage (e.g., "increase volume by 20%"). Such an audio cue would result in an immediate adjustment by the given percentage. Other audio cues can be created by a user for controlling other media functions such as muting, navigating between channels, presenting on-demand options, presenting DVR options, and so on.

In addition to creating customized audio and visual cues, cue models can be trained to detect unique biometric speech characteristics of a user. Unique speech characteristics can include dialects, modeling of a user's voice, language modeling which may be specific to the user, and so on. Similarly, cue models can be trained to detect unique biometric visual characteristics of the user. Such characteristics can include unique physical features of the user, common gestures made by the user, and so on. With speech recognition technologies and image recognition technologies a tailored cue model can be generated for each user to enhance the accuracy of audio and visual cue detection. A cue model as just described can be implemented with computing resources (such as a server) and software applications that can perform audio and image processing.

Referring back to step 316, once an audio and/or visual cue is detected, the system 200 can determine in step 318 whether the audio or visual cue represents a recognizable command for controlling the media center. If the system 200 detected an audio and/or visual cue of more than one user, then the system 200 proceeds to step 320 where it determines if cues detected from multiple users are conflicting. For example, suppose a teenager requests by way of an audio or visual cue that the volume be raised for a particular program. Further suppose that the parent of the teenager invokes a command (by audio or visual cue) establishes a maximum volume threshold or negates the request made by the teenager (e.g., "do not allow volume to be changed"). If the teenager's request to increase the volume exceeds the threshold requested by the parent, or the parent negates the teenager's request, then a conflict arises.

In instances where a conflict exists, the system 200 can proceed to step 322 where it selects processing of the command initiated by one of the users over the other according to a conflict resolution strategy. The conflict resolution strategy can use, for example, priorities between users to resolve conflicts. For instance, a parent can be assigned a higher priority than a teenage son, in which case the parent's command is processed and the teenage son's command is ignored. In another embodiment, the conflict resolution strategy can use a first-come first-serve strategy. The user providing a command prior to another user is recognized before the other user.

In another embodiment, the conflict resolution strategy may require a communication exchange between system 200 and the users in conflict. The exchange can be an audible and/or visual exchange. For example, the system 200 can direct the set-top box to audibly notify the users in conflict of the conflicting messages, and ask the users to agree as to who will control the media center and who will relinquish control. The exchange can also be performed visually by way of the system 200 directing the set-top box to present a message on a display describing the conflict being detected, and requesting that the users respond with a resolution by way of an audible and/or visual cue indicating who will control the media center and who will relinquish control. Other suitable embodiments for conflict resolution can be used as a basis for the conflict resolution strategy of step 322.

Once the user has been selected, the system 200 can proceed to step 324 where it retrieves a user profile associated with the user. The user profile can describe preferred default settings of the media center, preferred social networks, preferred media content, and so on. The user profile can be used in step 326 to configure the media center, initiate communication with social networks of interest to the user, and/or initiate access to preferred content. Once the media center has been configured, the system 200 can proceed to step 328 and process the command provided by the user, which may be in the form of an audio cue, a visual cue, or a combination thereof, and direct the set-top box according to the processed command (e.g., change channels, change volume, present a search guide for media content, etc.).

Figure 4:
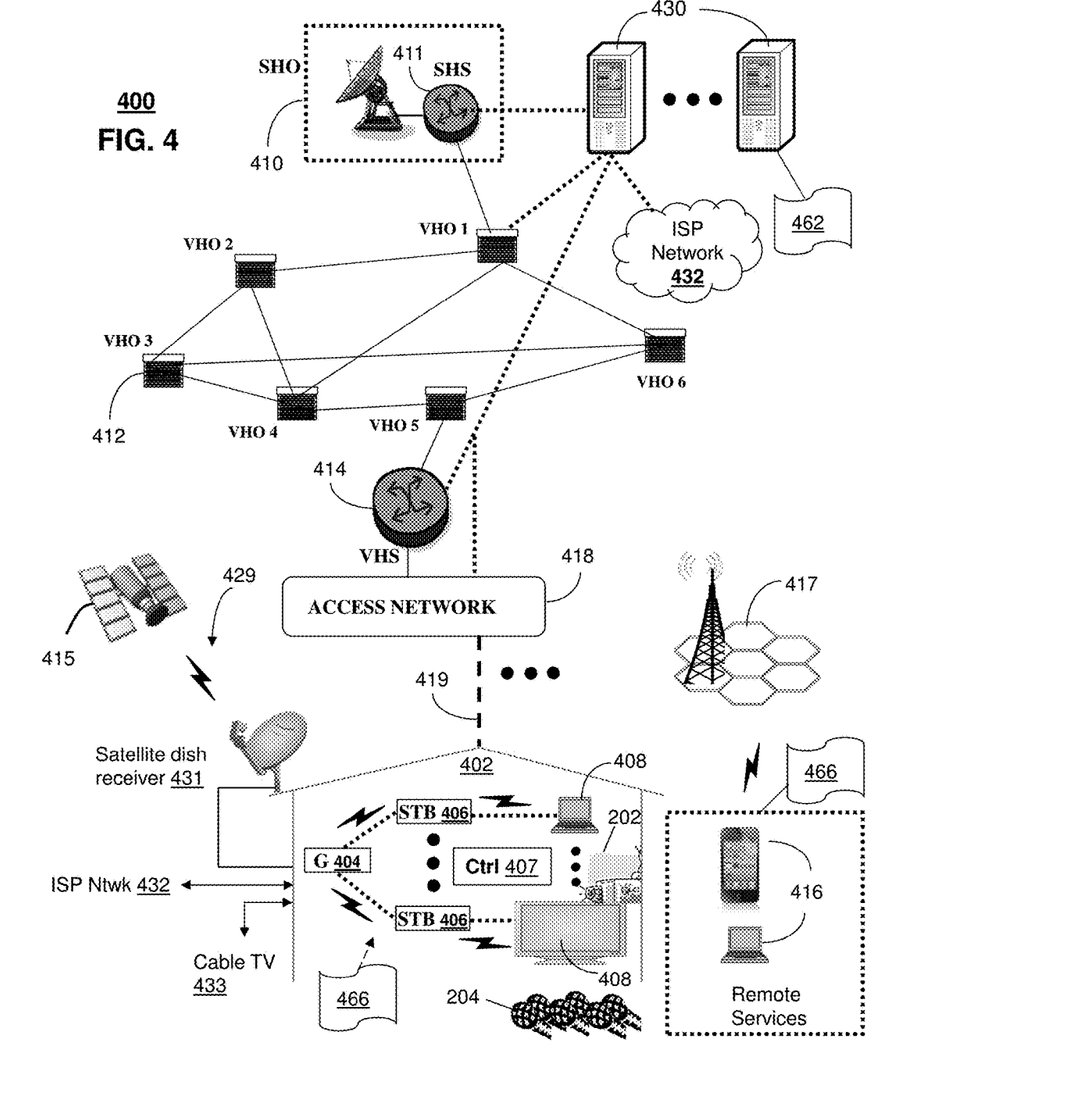
FIGS. 4-5 depict illustrative embodiments of communication systems that provide media services.

FIG. 4 depicts an illustrative embodiment of a first communication system 400 for delivering media content. The communication system 400 can represent an Internet Protocol Television (IPTV) media system. Communication system 400 can be overlaid or operably coupled with system 200 as another representative embodiment of communication system 400. Communication system 400 can be configured to perform a method of detecting with a plurality image sensors a plurality of human figures, steering the plurality of image sensors to identify the plurality of human figures, identifying the plurality of human figures according to the image data provided by the plurality of image sensors, steering a microphone array according to the image data to detect speech signals generated by the plurality of human figures, detecting a first command comprising one of a first audible cue provided by the microphone array, a first visual cue provided by the plurality of image sensors, or both for controlling a media center, and processing the first command to control the media center.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provides broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system 429 can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server (herein referred to as server 430). The server 430 can use computing and communication technology to perform function 462, which can include among other things, the features of system 200 described above. The media processors 406 and wireless communication devices 416 can be provisioned with software functions 464 and 466, respectively, to utilize the services of server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
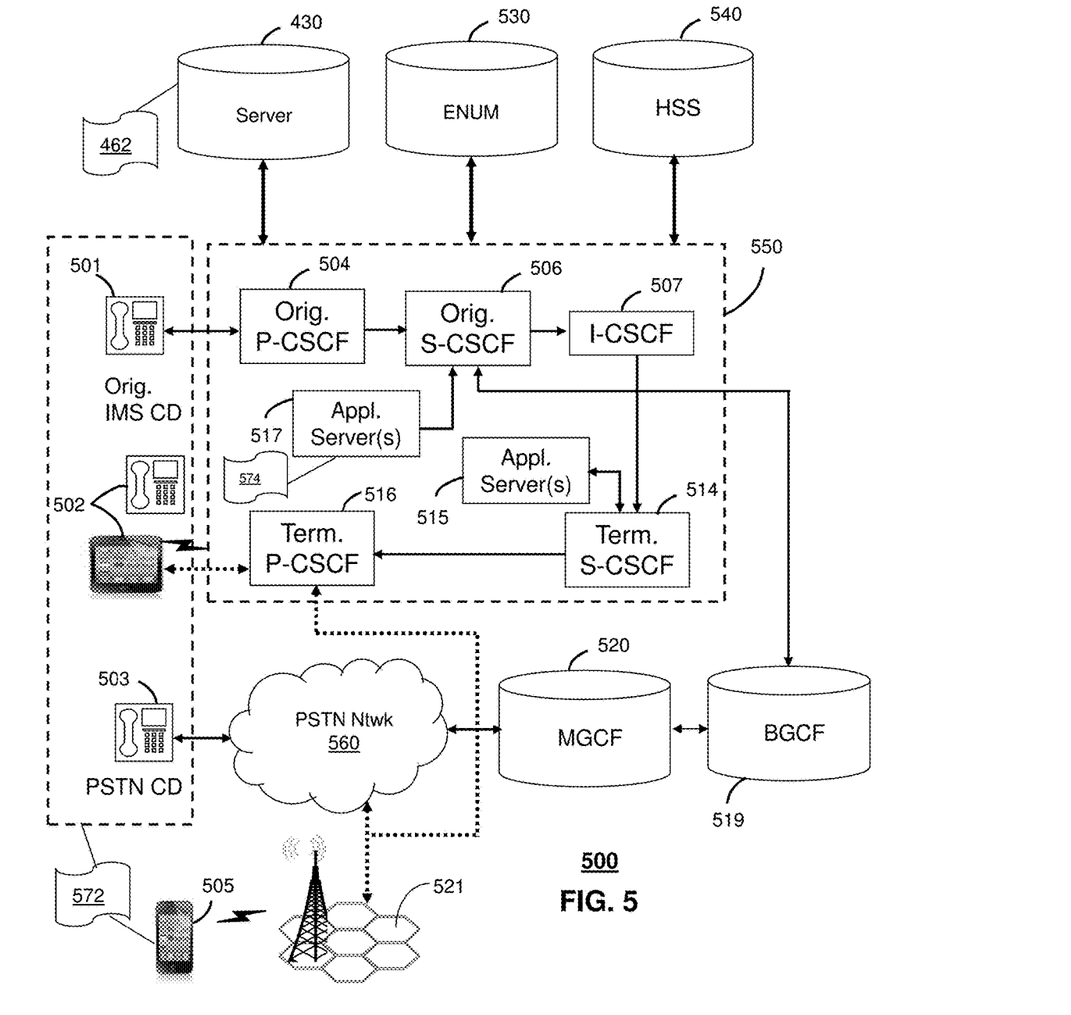

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 200 and/or communication system 400 as another representative embodiment of system 200 and/or communication system 400. Communication 500 can be configured to perform a method of detecting with a plurality image sensors a plurality of human figures, steering the plurality of image sensors to identify the plurality of human figures, identifying the plurality of human figures according to image data provided by the plurality of image sensors, steering a microphone array according to the image data to detect speech signals generated by the plurality of human figures, detecting a first command comprising one of a first audible cue provided by the microphone array, a first visual cue provided by the plurality of image sensors, or both for controlling a media center, and processing the first command to control the media center. The image sensors and microphone array can be integrated in the communication devices of FIG. 5, or can be in a vicinity of said communication devices (not shown) and communicatively coupled to the communication system of FIG. 5.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating"

and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. Server 430 can perform function 462 and thereby provide media processing services to the CDs 501, 502, 503 and 505 of FIG. 5. CDs 501, 502, 503 and 505, which can be adapted with software to perform function 572 to utilize the services of the server 430. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
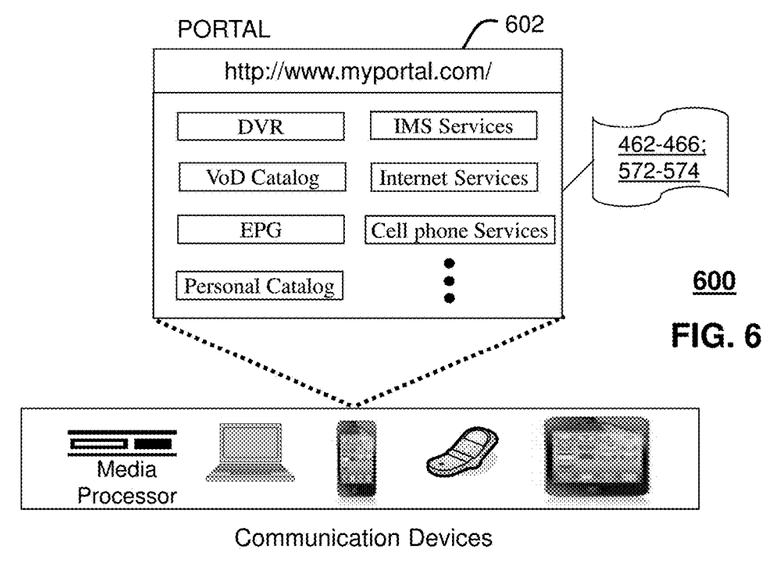
FIG. 6 depicts an illustrative embodiment of a web portal for interacting with the communication systems of FIGS. 2, and 4-5.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with system 200, communication 400, and/or communication system 500 as another representative embodiment of system 200, communication system 400, and/or communication system 500. The web portal 602 can be used for managing services of communication systems 200, 400, and 500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and service providers of communication systems 200, 400, and 500.

Figure 7:
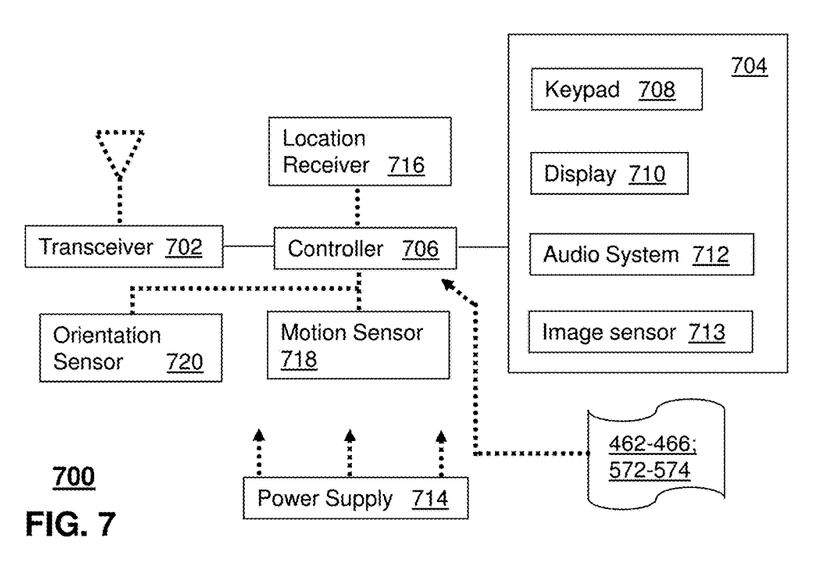
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 4-5. Communication device 700 can be configured to perform a method of detecting with a plurality image sensors a plurality of human figures, steering the plurality of image sensors to identify the plurality of human figures, identifying the plurality of human figures according to image data provided by the plurality of image sensors, steering a microphone array according to the image data to detect speech signals generated by the plurality of human figures, detecting a first command comprising one of a first audible cue provided by the microphone array, a first visual cue provided by the plurality of image sensors, or both for controlling a media center, and processing the first command to control the media center.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone array for receiving audible signals of one or more end users. The audio system 712 can also be used for voice recognition applications. The UI 704 can further include a plurality of directional image sensor 713 such as a charged coupled device (CCD) cameras for capturing and tracking still or moving images of one or more users.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of communication systems 200, 400, and 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, all or a portion of the infrastructure shown in FIG. 2 can be integrated into a media center. The media center can represent any computing device that can perform media processing and the processing features described in FIG. 3. In another embodiment, method 300 can be adapted to control other types of systems such as an audio system, a lighting system, an alarm system, a temperature system, a health monitoring system, or combinations thereof.

In another embodiment, method 300 can be adapted to recognize minors by demographic characteristics (e.g., height, estimated body weight) and/or by information provided in a user profile. The user profile can include parental controls to prevent the detected minor from requesting certain media content types. In the case where another user (who is not a minor) is in control of the media center, method 300 can be further adapted to prevent presentation of certain media content that would not be accessible to the minor if the minor is detected by the system 200 to be present in a viewing area. This prevents the minor from trying to circumvent the parental controls.

In yet another embodiment, method 300 can be adapted to provide audio and/or visual feedback to a user in control of the media system as shown in FIG. 2. The audio and/or visual feedback provides the user in control a means to interact (converse) with the media system to achieve the user's objectives. The user can converse, for example, with an avatar presented in a display of the media system. Alternatively, the user can converse with an avatar only through speech without a visual presentation of the avatar.

In yet another embodiment, method 300 can be adapted to detect potential sources for controlling the media system as shown in FIG. 2 whether or not such sources take on a human form. For example, a source may be a robot that is providing services in a residence and which is attempting to control the media system with speech commands. Another source may be someone dressed in a costume during Halloween. The individual may not seem human as a result of the costume, but nonetheless the individual may desire to control the media system. In an embodiment where the source is not recognizable with facial recognition, method 300 can recognize the source by other features such as voice recognition and/or body characteristics, dimensions, heat signature, or other identifiable characteristic that is not masked or is not maskable.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
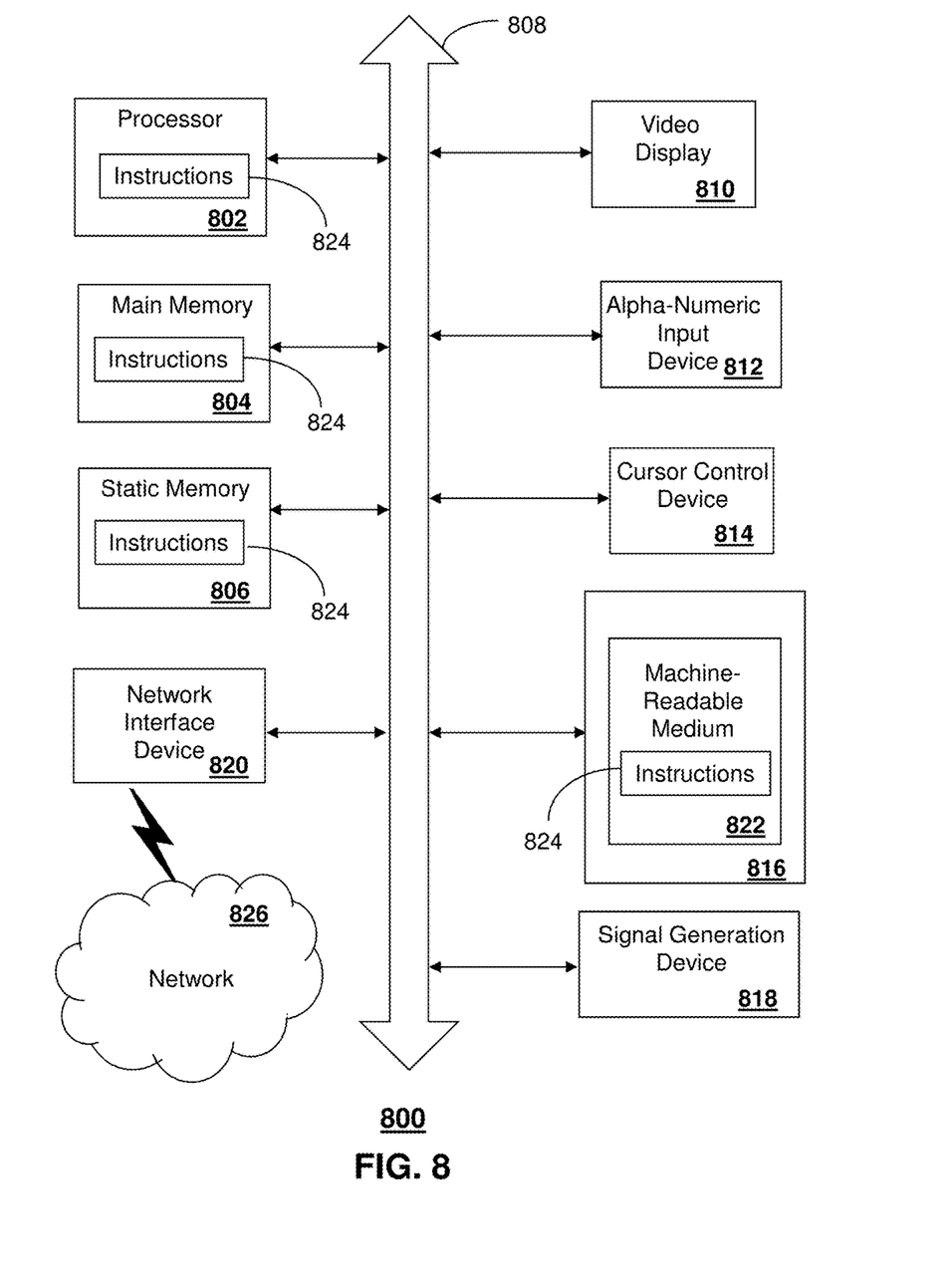
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the server 430, media processor 406 and other devices of FIGS. 2 and 4-6. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable component may perform such operations on the controllable device directly or indirectly by way of an intermediate device directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    associating, by a processing system comprising a processor, a first gesture of a first object of a plurality of objects based on images from image data with a first command for controlling a media center, wherein the image data is captured by a plurality of image sensors;
    associating, by the processing system, a second gesture of a second object of the plurality of objects based on the images from the image data with a second command for controlling the media center, wherein the second gesture is based on images detected by the plurality of image sensors;
    modifying, by the processing system, the first command to a modified command according to a characteristic of the first gesture;
    determining, by the processing system, a conflict between the first command and the second command;
    presenting, by the processing system, a notification indicating the conflict and requesting a resolution to the conflict;
    determining, by the processing system, if a response to the notification indicates the resolution is to perform the first command or the second command; and
    responsive to a first determination that the response indicates the resolution is to perform the first command processing, by the processing system, the modified command to control the media center responsive to determining the response indicates the resolution is to perform the first command.

2. The method of claim 1, further comprising:
    obtaining, by the processing system, directional information associated with the plurality of objects according to the image data provided by the plurality of image sensors; and
    steering, by the processing system, a microphone array towards one of the plurality of objects according to the directional information to detect speech signals generated by the plurality of objects.

3. The method of claim 2, wherein the steering of the microphone array comprises steering, by the processing system, a plurality of beams of the microphone array according to a beamforming process.

4. The method of claim 3, further comprising using, by the processing system, the image data provided by the plurality of image sensors to assign a beam of the plurality of beams to each of the plurality of objects.

5. The method of claim 2, further comprising:
    tracking, by the processing system, movements of the plurality of objects according to the image data provided by the plurality of image sensors;

steering, by the processing system, the plurality of image sensors according to the movements of the plurality of objects; and steering, by the processing system, the microphone array according to the movements of the plurality of objects.

6. The method of claim 1, further comprising determining a quality of performance for the first command for controlling the media center according to the characteristic of the first gesture that is determined.

7. The method of claim 6, wherein the quality of performance of the modified command comprises a magnitude of performance.

8. The method of claim 1, further comprising selecting, by the processing system, the first command provided by the first object based on a conflict resolution strategy, wherein the conflict resolution strategy comprises assigning a first priority to the first object and assigning a second priority to the second object, and wherein selecting the first command comprises selecting the first command based on the first priority having a higher priority than the second priority.

9. The method of claim 1, wherein responsive to a second determination that the response indicates the resolution is to perform the second command processing, by the processing system, the second command to control the media center responsive to determining the response indicates the resolution is to perform the second command.

10. The method of claim 1, further comprising identifying, by the processing system, each of the plurality of objects by comparing the image data with biometric profiles.

11. The method of claim 10, wherein the biometric profiles comprise one of facial data, body contour data, body color data, body surface data, or combinations thereof.

12. The method of claim 1, wherein the characteristic of the first gesture comprises a speed of the first gesture.

13. The method of claim 1, further comprising:
assigning, by the processing system, one of an acoustic model, a visual model, or a combination thereof to each of the plurality of objects; and
processing, by the processing system, one of audible cues, visual cues, or a combination thereof generated by the plurality of objects according to the acoustic model, the visual model or both assigned to each of the plurality of objects.

14. A non-transitory computer-readable storage medium, comprising executable instructions that, when executed by a processing system comprising a processor, facilitate performance of operations, comprising:
detecting a first gesture of a first object of a plurality of objects captured by one of a plurality of cameras as image data for controlling a media center, wherein the first gesture is associated with a first command;
detecting a second gesture of a second object of the plurality of objects based on the image data from one of the plurality of cameras, wherein the second gesture is associated with a second command for controlling the media center;
determining a conflict between the first command and the second command;
presenting a notification indicating the conflict and requesting a resolution to the conflict;
determining if a response to the notification indicates the resolution is to perform the first command;
modifying the first command according to a quality of performance to reflect a characteristic of the first gesture to generate a modified command responsive to determining the response indicates the resolution is to perform the first command; and controlling the media center according to the modified command according to the quality of performance responsive to determining the response indicates the resolution is to perform the first command.

15. The non-transitory computer-readable storage medium of claim 14, wherein the operations further comprise directing a plurality of microphones to steer a plurality of beams to each of the plurality of objects, and wherein the characteristic of the first gesture comprises speed of the first gesture, duration of the first gesture, or any combination thereof.

16. The non-transitory computer-readable storage medium of claim 14, wherein the processor further performs operations comprising:
selecting the first command according to a conflict resolution strategy, and
wherein the quality of performance of the modified command comprises a magnitude of performance, a speed of performance, or any combination thereof.

17. A system, comprising:
a processing system including a processor; and
a memory that stores executable instructions that, when executed by the processing system, facilitate performance of operations, comprising:
detecting a first gesture of a first object of a plurality of objects based on image data captured by a plurality of image sensors, wherein the first gesture is associated with a first command for controlling a media center;
detecting a second gesture of a second object of the plurality of objects based on images captured by the plurality of image sensors, wherein the second gesture is associated with a second command for controlling the media center;
determining a conflict between the first command and the second command of a second object of the plurality of objects;
presenting a notification requesting a resolution to the conflict;
determining if a response to the notification indicates the resolution is to perform the first command;
modifying the first command according to a quality of performance to reflect a characteristic of the first gesture to generate a modified command responsive to determining the response indicates the resolution is to perform the first command; and
controlling the media center to execute the modified command according to the quality of performance responsive to determining the response indicates the resolution is to perform the first command.

18. The system of claim 17, wherein the operations further comprise:
identifying the plurality of objects according to image data provided by the plurality of image sensors; and
exchanging messages with one of the plurality of objects that generated the first command, wherein the messages comprise one of audible speech, visual messages presented by way of a display device coupled to the processor, or a combination thereof.

19. The system of claim 17, wherein the operations further comprise controlling the media center to execute the second command responsive to determining the response indicates the resolution is to perform the second command.

20. The system of claim 17, operations further comprise:
tracking movements of the plurality of objects according to the image data provided by the plurality of image sensors;

steering the plurality of image sensors according to the movements of the plurality of objects; and steering a microphone array according to the movements of the plurality of objects.

* * * * *